(12) United States Patent
Jeon et al.

(10) Patent No.: US 10,889,668 B2
(45) Date of Patent: *Jan. 12, 2021

(54) METHOD FOR PREPARING VINYL CHLORIDE-BASED POLYMER, AND VINYL CHLORIDE-BASED POLYMER PREPARED THEREBY

(71) Applicant: LG CHEM, LTD., Seoul (KR)

(72) Inventors: Yang Jun Jeon, Daejeon (KR); Hyun Kyou Ha, Daejeon (KR); Joong Chul Lim, Daejeon (KR); Jin Hyuck Ju, Daejeon (KR); Min Jeong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/752,846

(22) PCT Filed: Mar. 29, 2017

(86) PCT No.: PCT/KR2017/003447
§ 371 (c)(1),
(2) Date: Feb. 14, 2018

(87) PCT Pub. No.: WO2017/191899
PCT Pub. Date: Nov. 9, 2017

(65) Prior Publication Data
US 2018/0244815 A1    Aug. 30, 2018

(30) Foreign Application Priority Data

May 3, 2016    (KR) .................. 10-2016-0054645
Mar. 28, 2017   (KR) .................. 10-2017-0039347

(51) Int. Cl.
*C08F 2/18*    (2006.01)
*C08F 2/20*    (2006.01)
(Continued)

(52) U.S. Cl.
CPC .............. *C08F 14/06* (2013.01); *C08F 2/18* (2013.01); *C08F 2/20* (2013.01); *C08F 2/44* (2013.01);
(Continued)

(58) Field of Classification Search
CPC ...... C08F 2/18; C08F 2/20; C08F 2/44; C08F 14/06; C08L 1/26; C08L 29/04
See application file for complete search history.

(56) References Cited

U.S. PATENT DOCUMENTS 9,428,601 B2    8/2016 Ahn et al.
2010/0190946 A1  7/2010 Ahn et al.
(Continued)

FOREIGN PATENT DOCUMENTS

CN    101506249 A    8/2009
CN    103370341 A    10/2013
(Continued)

*Primary Examiner* — Bijan Ahvazi
(74) *Attorney, Agent, or Firm* — Dentons US LLP

(57) ABSTRACT

The present invention provides a method for preparing a vinyl chloride-based polymer and a vinyl chloride-based polymer prepared thereby, the method comprising a step for performing suspension polymerization of a monomer for preparing a vinyl chloride-based polymer in the presence of a polymerization initiator, a dispersant, and water soluble cellulose ether, wherein the dispersant includes a mixture of two or more kinds of polyvinyl alcohol having different degrees of saponification, and the mole average degree of saponification of the polyvinyl mixture is from 76 mol % to 80 mol %, and the water soluble cellulose ether has a gel point of 60° C. to 90° C. and is added before the initiation of polymerization or at a time in which the polymerization conversion rate is 70% or less.

13 Claims, 2 Drawing Sheets

— · — Polymerization temperature
- - - - Polymerization pressure
——— R/CN flow rate ⟶ Time elapsed

(51) Int. Cl.
  *C08L 1/26* (2006.01)
  *C08F 14/06* (2006.01)
  *C08F 2/44* (2006.01)
  *C08L 27/06* (2006.01)
  *C08L 29/04* (2006.01)

(52) U.S. Cl.
  CPC ................ *C08L 1/26* (2013.01); *C08L 27/06* (2013.01); *C08L 29/04* (2013.01); *C08L 2205/025* (2013.01); *C08L 2205/035* (2013.01)

(56) References Cited

U.S. PATENT DOCUMENTS

| | | |
|---|---|---|
| 2010/0267912 A1 | 10/2010 | Ahn et al. |
| 2013/0324655 A1 | 12/2013 | Yoshii |
| 2017/0291974 A1 | 10/2017 | Ahn et al. |

FOREIGN PATENT DOCUMENTS

| | | | |
|---|---|---|---|
| EP | 3284761 A1 | 2/2018 | |
| JP | 6-41209 A | 2/1994 | |
| JP | 6-107712 A | 4/1994 | |
| JP | 09-263601 A | 10/1997 | |
| JP | 9-278806 A | 10/1997 | |
| JP | 09263601 A * | 10/1997 | .............. C08F 14/06 |
| JP | 09278806 A * | 10/1997 | .............. C08F 14/06 |
| JP | 10-279610 A | 10/1998 | |
| KR | 10-2011-0006224 A | 1/2011 | |
| KR | 20110006224 A * | 1/2011 | .............. C08F 14/06 |
| KR | 10-1199094 B1 | 11/2012 | |
| WO | 2007/145416 A1 | 12/2007 | |

\* cited by examiner

METHOD FOR PREPARING VINYL CHLORIDE-BASED POLYMER, AND VINYL CHLORIDE-BASED POLYMER PREPARED THEREBY

CROSS-REFERENCE TO RELATED APPLICATIONS

This application is a National Stage Application of International Application No. PCT/KR2017/003447 filed on Mar. 29, 2017, which claims the benefit of Korean Patent Application No. 10-2016-0054645 filed on May 3, 2016 and Korean Patent Application No. 10-2017-0039347 filed on Mar. 28, 2017, all of which are hereby incorporated by reference in their entirety for all purposes as if fully set forth herein.

TECHNICAL FIELD

The present invention relates to a method for preparing a vinyl chloride-based polymer, and a vinyl chloride-based polymer prepared thereby, the method being capable of maintaining excellent physical properties and a high conversion rate by activating the initial reaction and controlling heating value at the end of the reaction while being able to secure heat removal flow rate and improve productivity.

BACKGROUND ART

A vinyl chloride-based polymer is a homopolymer of vinyl chloride, or a copolymer containing at least 50% of vinyl chloride, and is used in a variety of applications due to being inexpensive, having an easily controlled hardness, and being applicable to most processing units. Moreover, a vinyl chloride-based polymer is widely used in various fields because it can provide molded products having excellent physical and chemical properties, such as mechanical strength, weather resistance, and chemical resistance.

Typically, when a vinyl chloride-based polymer is prepared by suspension polymerization, there is a pattern in which heating value increases greatly at the end of the reaction when preparing a polymer having a degree of polymerization of at least 1000 due to the nature of polymerization. Because of this, heat removal flow rate in a reflux condenser reaches a maximum at the end of the reaction. Therefore, it is necessary for a heating value pattern to be in the early or middle stage of polymerization in order to uniformly distribute heat removal flow rate and to secure the flow rate at the end the reaction.

As a means to improve heat removal efficiency at the end of polymerization, a non-isothermal polymerization technique has been traditionally suggested, which maintains the same degree of polymerization and has reaction activity at the beginning by increasing polymerization temperature at the beginning and lowering the temperature at the end. However, in this method, the bulk density of a prepared vinyl chloride-based polymer is lowered, the polymerization conversion rate thereof is greatly reduced, and separate equipment is required for application of non-isothermal polymerization. Also, although there is a method for maximizing the initial reaction activity and lowering heating value at the end by using an initial activity initiator, there are problems of fish eye and the deterioration of thermal stability, and the activity is relatively low, which increases the reaction time.

Accordingly, it is required to develop a method capable of improving heat removal efficiency in the preparation of a vinyl chloride-based polymer.

DISCLOSURE OF THE INVENTION

Technical Problem

An object of the present invention is to provide a novel method for preparing a vinyl chloride-based polymer, the method being capable of uniformly distributing heat removal flow rate, and as a result, improving productivity by activating the initial reaction and controlling heating value at the end of the reaction.

Another object of the present invention is to provide a vinyl chloride-based polymer prepared by the preparation method, and having excellent physical characteristics and an excellent polymerization conversion rate, and a vinyl chloride-based resin composition including the same.

Technical Solution

In order to solve the problem, according to an embodiment of the present invention, there is provided a method for preparing a vinyl chloride-based polymer comprising a step for performing suspension polymerization of a monomer for preparing a vinyl chloride-based polymer in the presence of a polymerization initiator, a dispersant, and water soluble cellulose ether, wherein the dispersant includes a mixture of two or more kinds of polyvinyl alcohol having different degrees of saponification, and a mole average degree of saponification of the polyvinyl alcohol mixture is from 76 mol % to 80 mol %, and the water soluble cellulose ether has a gel point of 60° C. to 90° C. and is added before the initiation of the polymerization or at a time in which the polymerization conversion rate is 70% or less.

According to another embodiment of the present invention, there is provided a vinyl chloride-based polymer prepared by the method, and having an average particle diameter of 130 to 155 μm and an apparent specific gravity of 0.55 to 0.6.

According to another embodiment of the present invention, there is provided a vinyl chloride-based resin composition including a vinyl chloride-based polymer prepared by the method.

Advantageous Effects

A method for preparing a vinyl chloride-based polymer according to the present invention is capable of preparing a vinyl chloride-based polymer having excellent physical properties and a high polymerization conversion rate by activating the initial reaction and controlling heating value at the end of the reaction during the preparation of a vinyl chloride-based polymer. In addition, the method is capable of uniformly distributing heat removal flow rate during the preparation of a vinyl chloride-based polymer, and as a result, improving productivity.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and there

MODE FOR CARRYING OUT THE INVENTION

Figure 1:
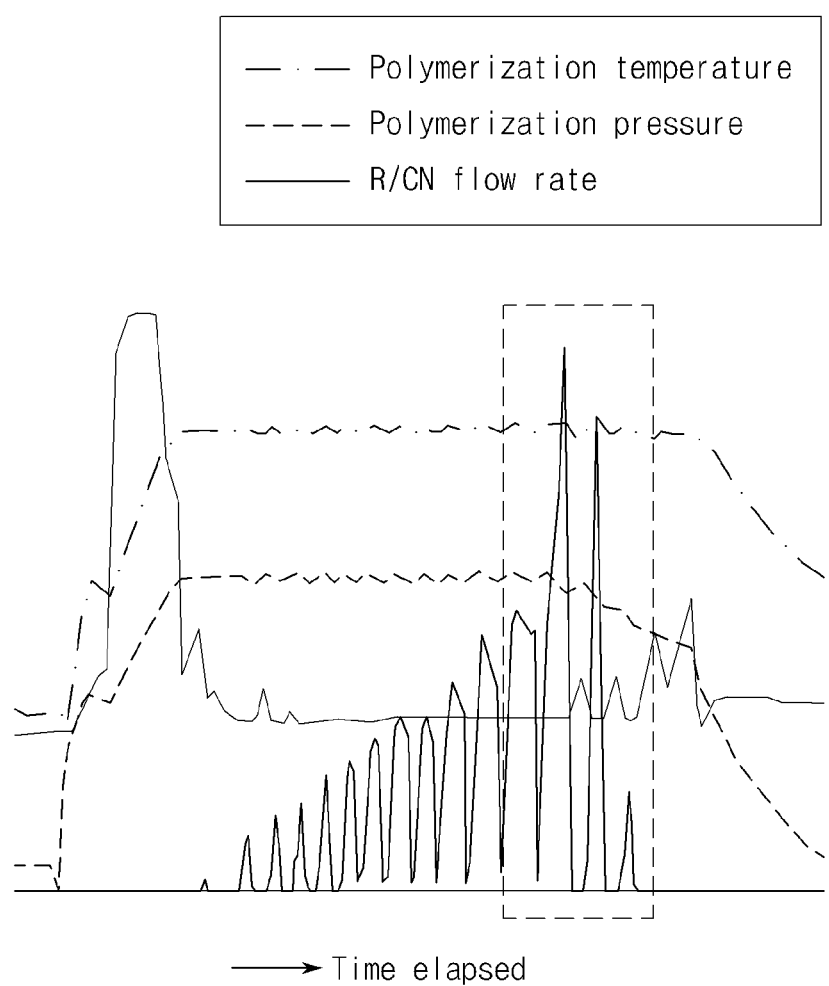
- FIG. 1 is a graph illustrating a heat removal pattern observed during the preparation of a vinyl chloride-based polymer according to Comparative Example 1.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, two or more kinds of modified polyvinyl alcohol (PVA) having specific degrees of saponification by a modification of PVA used as a typical dispersant during a preparation of a vinyl chloride-based polymer by suspension polymerization are used. But by controlling the mole average degree of saponification of the PVA mixture, it is possible to activate the initial reaction and to lower the maximum heating value at the end of the reaction when preparing a vinyl chloride-based polymer.

PVA absorbed on the surface of a droplet of a vinyl chloride-based monomer at the beginning of the reaction forms an obstruction wall such that droplets in contact with each other are detached. The lower the degree of saponification, the lower the interfacial tension between a vinyl chloride-based monomer and water, and therefore, PVA is more firmly absorbed on the surface of a droplet. As a result, swelling is facilitated between droplets, thus causing more aggregation and transformation, and in the primary particle inside a droplet, a greater shearing force is incurred such that particles aggregate at an earlier stage and form an open network. This process occurs at the beginning of the reaction at a time in which the polymerization conversion rate is 10% or less. Therefore, by adding a PVA mixture with a controlled mole average degree of saponification at a time in which the polymerization conversion rate is 10% or less, it is possible to activate the initial reactivity to a greater degree than in existing reactions, and as a result, improve the problem of heat removal flow rate being concentrated at the end of the reaction by making heating value more uniform. It is also possible to solve the problem, in conventional isothermal or non-isothermal polymerization, wherein charge volume and initiator addition amount are limited due to a heat removal pattern in which the heat removal flow rate at the end of the reaction is insufficient. Moreover, the method for preparing a vinyl chloride-based polymer according to an embodiment of the present invention may be extended to all grades having the maximum heating pattern at the end of the reaction, and it is possible to maximize the production amount per batch, and therefore improve productivity, by further increasing the amount of polymerization initiator by securing heat removal flow rate.

In the present invention, "heat removal flow rate" is the total amount of cooling water injected to control the temperature inside a reactor. For example, inside a polymerization reactor, the temperature rises due to exothermic reaction as polymerization proceeds, and cooling water is used to suppress the rising of the temperature. Heat removal flow rate may be the sum of the amount of cooling water injected into a reactor jacket and the amount of cooling water injected into an upper reflux condenser.

In addition, the degree of polymerization of a vinyl chloride-based polymer is determined by polymerization temperature, and since the degree of polymerization of a vinyl chloride-based polymer is a factor which greatly affects processing conditions and the physical properties of a product, it is important to control polymerization temperature during a polymerization reaction. Polymerization temperature may differ according to the kind of polymerization initiator used in a polymerization reaction, the polymerization method, whether or not a polymerization degree control agent is used, and the desired degree of polymerization. However, in a method for preparing a vinyl chloride-based polymer according to an embodiment of the present invention, the polymerization temperature may be from 50° C. to 65° C., more specifically, from 50° C. to 60° C. When considering such polymerization temperature conditions, water soluble cellulose ether should have a gel point that is higher than the above described polymerization temperature, specifically, 60° C. to 90° C., to prevent the formation of non-uniform particles or large particles caused by deterioration of dispersion stability due to gelation of cellulose during the polymerization, and also to prevent high SPAN (particle size distribution) and the generation of a large number of fine particles from causing the deterioration of physical properties. Furthermore, due to having a higher dispersion stability than a polyvinyl alcohol-based dispersant, the influence that the presence or absence of cellulose has on the stability of particles is greater. By using cellulose having the gel point as described above, the role as a dispersant can be efficiently performed by preventing gelation at a polymerization temperature. Therefore, the effect of initial reaction activation can be further improved by increasing the dispersibility of a monomer and an initiator at the beginning of a reaction.

Particularly, the method for preparing a vinyl chloride-based polymer according to an embodiment of the present invention comprises a step for performing suspension polymerization of a monomer for preparing a vinyl chloride-based polymer in the presence of a polymerization initiator, a dispersant, and water soluble cellulose ether, wherein the dispersant includes a mixture of two or more kinds of polyvinyl alcohol having different degrees of saponification, and the mole average degree of saponification of the polyvinyl alcohol mixture is from 76 mol % to 80 mol %, and the water soluble cellulose ether has a gel point of 60° C. to 90° C. and is added before the initiation of polymerization or at a time in which the polymerization is 70% or less. In the present invention, the polymerization conversion rate can be calculated from the amount of vinyl chloride-based monomers recovered after the completion of the reaction, which is measured using a flow meter. The polymerization conversion rate includes a measurement error range of ±2%. Also, a 0% polymerization conversion rate is meant to include the time of the initiation of polymerization or the time up to the initiation of polymerization.

In the method for preparing a vinyl chloride-based polymer according to an embodiment of the present invention, the suspension polymerization can be performed by adding a vinyl chloride-based monomer to a polymerization reactor filled with one or more additives such as a solvent, a polymerization initiator, and selectively, a protective colloid auxiliary, and starting a reaction. Here, the entire amount of each of a dispersant and a water-soluble cellulose ether for stabilizing reactants including a vinyl chloride-based monomer and allowing uniform and stable particles to be formed during the polymerization may be added to the polymerization system before the initiation of polymerization, or the dispersant and water-soluble cellulose may be added in portions or continuously, from the beginning to the end of polymerization. Specifically, the dispersant may be added at a time in which the polymerization conversion rate is 10% or less and the water-soluble cellulose ether may be added at a time in which the polymerization conversion rate is 70% or less.

In the preparation method according to an embodiment of the present invention, the dispersant includes a mixture of two or more kinds, or three or more kinds of polyvinyl alcohol having different degrees of saponification, wherein, by adjusting the degree of saponification and the mixing ratio, the polyvinyl alcohol mixture is included to have a mole average degree of saponification of 76 mol % to 80 mol %. If the mole average degree of saponification of the polyvinyl alcohol mixture is outside the above range, a large amount of particle residue (hereinafter, "particle residue") is generated, and it is difficult to form uniform particles. If the degree of saponification is outside of the above range and is less than 76 mol %, there is a concern that non-spherical particles, such as elliptical or rod-like particles, may be generated due to the lower stability of the particles. There is also a concern that the particles may become more non-uniform and have a lower bulk density than particles of equivalent particle diameter, and due to the wide particle size distribution, processing properties may be deteriorated. On the other hand, if the degree of saponification is greater than 80 mol %, particle stability increases, but development of pores inside a particle slows down, and thus plasticizer absorption rate may become too low. More specifically, the dispersant may include a mixture of two or more kinds of polyvinyl alcohol, wherein the mole average degree of saponification of the polyvinyl alcohol mixture is from 78 mol % to 80 mol %.

In addition, under the condition that satisfies the above range of mole average degree of saponification of the polyvinyl alcohol mixture, the dispersant may include a first polyvinyl alcohol having a degree of saponification of 60 mol % to 90 mol % and a second polyvinyl alcohol having a degree of saponification of 40 mol % to less than 60 mol % at a weight ratio of 10:1 to 20:1. By including a first and second polyvinyl alcohol having the above described optimum degrees of saponification in the optimum amount, it is possible to prepare a polyvinyl polymer having better physical properties and uniform particle size. More specifically, the dispersant may include a first polyvinyl alcohol having a degree of saponification of 60 mol % to 90 mol % and a second polyvinyl alcohol having a degree of saponification of 40 mol % to less than 60 mol % at a weight ratio of 13:1 to 17:1.

In addition, under the condition that satisfies the above range of mole average degree of saponification of the polyvinyl alcohol mixture and the conditions of the first and second polyvinyl alcohol at the same time, the first polyvinyl alcohol may include a 1a polyvinyl alcohol having a degree of saponification of 75 mol % to 90 mol % and a 1b polyvinyl alcohol having a degree of saponification of 60 mol % to less than 75 mol % at a weight ratio of 4:1 to 8:1. By including three kinds of polyvinyl alcohol having the above described optimum degrees of saponification in the optimum amount, it is possible to prepare a polyvinyl polymer having even more excellent physical properties and uniform particle size. More specifically, under the condition that satisfies the mole average degree of and the conditions of the first and second polyvinyl alcohol at the same time, the first polyvinyl alcohol may include the 1a polyvinyl alcohol and the 1b polyvinyl alcohol at a weight ratio of 4:1 to 6:1.

The dispersant may be included in an amount of 0.05 to 0.15 parts by weight based on 100 parts by weight of a vinyl chloride-based monomer. If a dispersant is used in an amount of less than 0.05 parts by weight, fish eye may occur due to an excessive increase in the particle size of a vinyl chloride-based polymer. If a dispersant is used in an amount greater than 0.15 parts by weight, the initial coloring property may be deteriorated due to an increase of fine particles. When considering the remarkable effects of improving the polymerization efficiency and physical properties of a vinyl chloride-based polymer by using a dispersant with a controlled degree of saponification, the dispersant may be used in an amount of 0.05 parts by weight to 0.1 parts by weight based on 100 parts by weight of a vinyl chloride-based monomer.

The entire amount of the dispersant may be added to a polymerization system before the initiation of polymerization. Or the dispersant may be added in portions or continuously after the beginning of polymerization until the end of polymerization. However, if added at a time in which the polymerization conversion rate is greater than 10%, the effects of activating the initial reaction and preventing the concentration of heat removal flow rate at the end of the reaction may be minimal. Accordingly, the dispersant may be added, more specifically, before the initiation of polymerization or at a time in which the polymerization conversion rate is 10% or less.

In addition, in a preparation method according to an embodiment of the present invention, the water soluble cellulose ether is a protective colloid auxiliary that stabilizes reactants and allows uniform and stable particles to be formed during the polymerization. Specific examples of the water soluble cellulose ether may include methylcellulose, hydroxyethylcellulose, or hydroxypropylmethylcellulose, and the like, and any one thereof or a mixture of two or more thereof may be used.

Among these, the water soluble cellulose ether may be one having a gel point of 60° C. to 90° C. If a gel point of water soluble cellulose ether is 60° C. or below, the efficiency thereof as a dispersant may be lowered due to gelation at the polymerization temperature. If a gel point thereof is over 90° C., water soluble cellulose ether may not function as a dispersant since bonding may occur between cellulose, or there may be few hydrophobic functional groups. Thus, when considering a remarkable effect of improvement achieved by controlling a gel point of water soluble cellulose ether, a gel point of the water soluble cellulose ether may be from 60° C. to 90° C.

Also, a gel point of the water soluble cellulose ether is determined according to the content of a hydrophobic group, for example, a methoxy group or a hydroxypropyl group, and the like, which is bonded at the end of a polymer. The water soluble cellulose ether which can be used in the present invention, within a range that satisfies the above described conditions of a gel point, may include a hydrophobic group in a molecule, specifically, a hydrophobic group including a methoxy group and a hydroxypropyl group, the content of which may be 20 to 40 wt % based on the total weight of the water soluble cellulose ether. More specifically, the water soluble cellulose ether may have the above described content of a hydrophobic group, wherein the degree of substitution with methoxy groups is 10 to 30 wt % and the degree of substitution with hydroxypropyl groups is 6.5 to 11.5 wt %. If the content of a hydrophobic group is greater than 40 wt %, the efficacy of the water soluble cellulose ether as a dispersant may be lowered due to gelation caused by the decrease in gel point. If the content of a hydrophobic group is less than 20 wt %, the water soluble cellulose ether may not function as a dispersant since bonding may occur between cellulose or there may be few hydrophobic functional groups due to an excessive increase in gel point.

The water soluble cellulose ether, in a 2% aqueous solution at 23±5° C., may have a viscosity of 100 cps to 250 cps. If a viscosity of the water soluble cellulose ether is greater than 250 cps, the dispersibility thereof in a solution is low, and therefore, the improvement effect may be insignificant when compared to the amount added.

In addition, the water soluble cellulose ether may be included in an amount of 0.01 to 0.02 parts by weight based on 100 parts by weight of a vinyl chloride-based monomer. If water soluble cellulose ether is used in an amount of less than 0.01 parts by weight, fish eye may occur due to an excessive increase in the particle size of a vinyl chloride-based polymer. If water soluble cellulose ether is used in an amount greater than 0.02 parts by weight, the initial coloring property may be deteriorated due to an increase of fine particles. When considering the remarkable effects of improving polymerization efficiency and the physical properties of a vinyl chloride-based polymer by using water soluble cellulose ether, the water soluble cellulose ether may be used in an amount of 0.01 parts by weight to 0.015 parts by weight based on 100 parts by weight of a vinyl chloride-based monomer.

The entire amount of the water soluble cellulose may be added to a polymerization system before the initiation of polymerization, or the water soluble cellulose may be added in portions or continuously after the beginning of polymerization until the end of polymerization. However, if added at a time in which the polymerization conversion rate is greater than 70%, the effect of improving dispersibility is not sufficient, and there are concerns that there is no effect of stabilizing the heating pattern at the end and no effect as a dispersant. Accordingly, the water soluble cellulose ether may be added, more specifically, before the initiation of polymerization or at a time in which a polymerization rate is 70% or less. More particularly, the water soluble cellulose ether may be added at the same time as a dispersant within the above mentioned addition period range.

In addition, in a method for preparing a vinyl chloride-based polymer according to an embodiment of the present invention, under the condition that satisfies the above described constitutive content conditions, the dispersant and the water soluble cellulose ether may be added to the polymerization system at a weight ratio of 5:1 to 10:1. If the content of water soluble cellulose ether on the addition amount of a dispersant is too high and exceeds the above described range, the development of internal pores slows down such that it becomes difficult to increase the plasticizer absorption rate above a specific level, which in turn, may cause a lot of fish eye. On the contrary, if the content thereof is excessively low, the stability of particles may decrease such that non-uniform particles may be formed. More particularly, the dispersant and the water soluble cellulose ether may be added to the polymerization system at a weight ratio of 5:1 to 7:1.

Meanwhile, a vinyl chloride-based polymer prepared by a method for preparing a vinyl chloride-based polymer according to an embodiment of the present invention may not only be a polymer consisting purely of a vinyl chloride-based monomer, but also a copolymer of the vinyl chloride-based monomer and a vinyl-based monomer copolymerizable with the vinyl chloride-based monomer having the vinyl chloride-based monomer as a main component. When the vinyl chloride-based polymer is a copolymer of a vinyl chloride-based monomer and a vinyl-based monomer, the copolymer may include at least 50% of vinyl chloride.

Accordingly, the vinyl chloride-based monomer usable for the suspension polymerization may be a single substance of vinyl chloride, or a mixture of vinyl chloride and a vinyl-based monomer copolymerizable with the vinyl chloride. The vinyl-based monomer may include, but is not limited to, olefin compounds such as ethylene, propylene and butene; vinyl esters such as vinyl acetate, vinyl propionate and vinyl stearate; unsaturated nitriles such as acrylonitrile; vinyl alkyl ethers such as vinyl methyl ether, vinyl ethyl ether, vinyl octyl ether and vinyl lauryl ether; vinylidene halides such as vinylidene chloride; unsaturated fatty acids such as acrylic acid, methacrylic acid, itaconic acid, maleic acid, fumaric acid, maleic anhydride and itaconic anhydride, and anhydrides of these fatty acids; unsaturated fatty acid esters such as methyl acrylate, ethyl acrylate, monomethyl maleate, dimethyl maleate and butyl benzyl maleate; and crosslinkable monomers such as diallyl phthalate, and any one thereof or a mixture of two or more thereof may be used.

In addition, the solvent may be deionized water, wherein the amount of the solvent may be appropriately adjusted according to the size of a polymerization reactor and the amount of a monomer used. For example, the solvent may be used in an amount of 70 parts by weight or more based on 100 parts by weight of a vinyl chloride-based monomer used in the suspension polymerization.

In addition, the polymerization initiator may be used in an amount of 0.02 parts by weight to 0.2 parts by weight based on 100 parts by weight of the vinyl chloride-based monomer used in polymerization. If the polymerization initiator is used in an amount less than 0.02 parts by weight, the polymerization reaction time may increase and the conversion rate to a vinyl chloride-based polymer may decrease, thereby causing a decrease in productivity. If the polymerization initiator is used in an amount greater than 0.2 parts by weight, the polymerization initiator may not be completely consumed during the polymerization, but may remain in the slurry of a vinyl chloride-based polymer that is ultimately prepared, and thereby cause the deterioration of thermal stability, and the like. More specifically, the polymerization initiator may be used in an amount of 0.04 parts by weight to 0.12 parts by weight based on 100 parts by weight of a vinyl chloride-based monomer.

Specifically, the polymerization initiator may include a peroxide-based compound such as dicumyl peroxide, dipentyl peroxide, di-3,5,5-trimethyl hexanoyl peroxide, or dilauryl peroxide; a peroxydicarbonate-based compound such as diisopropyl peroxydicarbonate, di-sec-butyl peroxydicarbonate, or di-2-ethylhexyl peroxydicarbonate; a peroxyester-based compound such as t-butyl peroxypivalate, 1,1,3,3-tetramethylbutyl peroxyneodecanoate, or t-butyl peroxyneodecanoate; an azo-based compound such as azo-bis-2,4-dimethylvaleronitrile; a hydroperoxide-based compound such as t-butyl hydroperoxide; or a sulfate-based compound such as potassium persulfate or ammonium persulfate, and any one thereof or a mixture of two or more thereof may be used.

In addition, the suspension polymerization may be performed at a temperature of 50° C. to 65° C., more particularly, 50° C. to 60° C. Moreover, since a polymerization reaction of a vinyl chloride-based polymer is an exothermic reaction, a process for removing heat through a reactor jacket and a reflux condenser(R/CN) may be performed in order to make the temperature change remain within a range of 0.1° C. to 0.2° C. during the suspension polymerization.

When a polymerization reaction is carried out while maintaining a specific level of temperature within the polymerization temperature range as describe above, it is possible to prevent the generation of foam and suppress re-polymerization and scale formation. Also, by inducing the decomposition of the remaining polymerization initiator at the end of the reaction, it is possible to prepare a vinyl chloride-based polymer having even more excellent physical properties, that is, a high degree of polymerization and improved melt processability after the reaction.

Also, in the suspension polymerization, an additive such as a protective colloid auxiliary, an antioxidant, a base, a cross-linking agent, a polymerization control agent, a chain transfer agent, a pH adjuster, an antistatic agent, a scale inhibitor, and a surfactant, may be further added as needed in addition to the above-described active ingredients, and the type and amount of the additive are not particularly limited and types and amounts known in the art may be used. The additive may be added at any point, for example, at the beginning of the suspension polymerization, in the middle of the polymerization, or after the polymerization, and may be added all at once or continuously.

As an example, the protective colloid auxiliary functions to stabilize reactants and allow uniform and stable particles to be formed during the polymerization, wherein the protective colloid auxiliary may be added in the beginning of the suspension polymerization. The protective colloid auxiliary may be, specifically, an unsaturated organic acid polymer.

The unsaturated organic acid polymer may specifically include an acrylic acid polymer, a methacrylic acid polymer, an itaconic acid polymer, a fumaric acid polymer, a maleic acid polymer, or a succinic acid polymer, and any one thereof or a mixture of two or more thereof may be used.

The protective colloid auxiliary may be added in an amount of 0.01 parts by weight to 0.02 parts by weight based on 100 parts by weight of a vinyl chloride-based monomer for preparing a vinyl chloride-based polymer. If a protective colloid auxiliary is used in an amount of less than 0.01 parts by weight, fish eye may occur due to an excessive increase in the particle size of a vinyl chloride-based polymer. If a protective colloid auxiliary is used in an amount greater than 0.02 parts by weight, the initial coloring property may be deteriorated due to an increase of fine particles. When considering the remarkable effects of improving polymerization efficiency and the physical properties of a vinyl chloride-based polymer by using a protective colloid auxiliary, the protective colloid auxiliary may be used in an amount of 0.01 parts by weight to 0.015 parts by weight based on 100 parts by weight of a vinyl chloride-based monomer.

In addition, the antioxidant functions to stop the polymerization by reacting with a radical of a vinyl chloride-based polymer, and may be added at the end of suspension polymerization, specifically, when the pressure change is in a range of 0.5 kg/cm² to 1.5 kg/cm² based on the equilibrium pressure at a polymerization temperature in a polymerization reactor. Generally, when preparing a vinyl chloride-based polymer by suspension polymerization, before the critical conversion, the pressure is maintained constant by maintaining the phase equilibrium between liquid and gas phases. However, after the critical conversion, as a vinyl chloride-based monomer in a gas phase is consumed, the equilibrium pressure is no longer maintained, and therefore, the pressure drops. As for this, in the present invention, by adding an antioxidant when the pressure drops below the predetermined level and ending the reaction, the melt processability of a vinyl chloride-based polymer may be greatly improved. As a result, it is possible to improve the productivity when producing processed molded products using the same.

The antioxidant is not particularly limited as long as it is generally used in preparing a vinyl chloride-based polymer, and specific examples may include, phenol compounds such as triethyleneglycol-bis[3-(3-t-butyl-5-methyl-4-hydroxyphenyl)propionate], hydroquinone, p-methoxyphenol, t-butyl hydroxy anisole, n-octadecyl-3-(4-hydroxy-3,5-di-t-butyl-phenyl)propionate,2,5-di-t-butylhydroquinone, 4,4-butylidenebis(3-methyl-6-t-butylphenol), t-butyl catechol, 4,4-thio-bis(6-t-butyl-m-cresol), and tocopherol; amine compounds such as N, N-di-phenyl-p-phenylene diamine and 4,4-bis (dimethylbenzyl) diphenylamine; and sulfur compounds, such as dodecyl mercaptan and 1,3-diphenyl-2-thiol, and any one thereof or a mixture of two or more thereof may be used.

In addition, the antioxidant may be used in an amount of 0.01 parts by weight to 1 parts by weight based on 100 parts by weight of a vinyl chloride-based monomer for preparing a vinyl chloride-based polymer. If the antioxidant is used in an amount of less than 0.01 parts by weight, fish eye may occur due to an excessive increase in the particle size of a vinyl chloride-based polymer. If the antioxidant is used in an amount greater than 1 parts by weight, the initial colorability may be deteriorated due to an increase of fine particles. When considering the remarkable improvement effects of improving polymerization efficiency and the physical properties of a vinyl chloride-based polymer by using an antioxidant, the antioxidant may be used in an amount of 0.05 parts by weight to 1 part by weight based on 100 parts by weight of a vinyl chloride-based monomer.

In addition, the base, due to having compatibility with a vinyl chloride-based monomer or a copolymerizable monomer, may be an oil soluble base capable of improving the apparent density of a vinyl chloride-based polymer by using only a small amount of a protective colloid auxiliary; or may be a water soluble base, such as sodium bicarbonate, functioning as an ion to the protective colloid.

Specifically, the oil soluble base may include an amine-based compound, such as triethylamine, dimethylethylamine, or diethylamine; an imidazole-based compound, such as imidazole, benzimidazole, or histidine; or, a phosphazene compound such as hexachlorocyclotriphosphazene or bis(triphenylphosphine)iminium chloride, and any one thereof or a mixture of two or more thereof may be used. Among these, the oil soluble base may be triethylamine or diethylamine, both of which having good reactivity with hydrogen chloride.

In addition, the water soluble base may include sodium carbonate, potassium carbonate, cesium carbonate, sodium bicarbonate, sodium hydroxide, potassium hydroxide, barium hydroxide, sodium ethoxide, sodium t-butoxide, sodium acetate, and tripotassium phosphate, and any one thereof or a mixture of two or more thereof may be used. Among these, the water soluble base may be sodium bicarbonate.

Also, the base may be added in an amount that allows the hydrogen ion concentration (pH) of a surface of a vinyl chloride-based polymer to remain in the range of 4 to 8. If the pH of a surface of a vinyl chloride-based polymer is less than 4, deterioration of thermal stability or corrosion of equipment may occur due to insufficient neutral reaction. If the pH is greater than 8, there are concerns that coloring may deteriorate and cost may increase. The amount of the base to be used may be adjusted according to the amount of a vinyl chloride-based monomer to be added or the amount of water to be added. However, more specifically, the base may be added in an amount of 0.001 parts by weight to 0.5 parts by weight based on 100 parts by weight of a vinyl chloride-based monomer.

The base may be added all at once or in two portions, or continuously at any time from the beginning of a suspension polymerization reaction to the end thereof. When considering an excellent improvement effect according to the timing of the addition of a base, the base may be added from the beginning of the reaction, or, since hydrogen chloride is continuously generated as the polymerization reaction proceeds, the base may be added continuously during the polymerization to maintain the above described pH range.

The cross-linking agent serves a role of increasing the degree of polymerization of a prepared vinyl chloride-based polymer. Specifically, the cross-linking agent may include diallyl maleate (DAM), diallyl phthalate (DAP), ethyl glycol dimethyl acrylate (EGDMA), triallyl isocyanurate (TAIC), and the like, and any one thereof or a mixture of two or more thereof may be used.

The cross-linking agent may be added having a concentration of 600 ppm to 800 ppm. If the concentration of a cross-linking agent is less than 600 ppm, the degree of polymerization of a prepared vinyl chloride-based polymer may be lowered. If the concentration of a cross-linking agent is greater than 800 ppm, the shape of a polymer may be changed or handling may not be easy when processing.

The cross-linking agent may be added before or during the polymerization. In addition, it may be added in portions or continuously during the polymerization. When considering the degree of polymerization of a prepared vinyl chloride-based polymer, more specifically, the cross-linking agent may be added before the initiation of polymerization or at a time in which the polymerization conversion rate is 5% or less.

By using the above described method for preparing a vinyl chloride-based polymer, it is possible to activate the initial reaction and to control heating value at the end of a reaction. As a result, heat removal flow rate can be secured and productivity can be improved. Also, a vinyl chloride-based polymer prepared by the preparation method has an excellent polymerization conversion rate as well as excellent physical properties, such as having a uniform particle size distribution.

Thus, according to another embodiment of the present invention, there is provided a vinyl chloride-based polymer prepared by the preparation method.

The vinyl chloride-based polymer may not only be a polymer consisting purely of a vinyl chloride-based monomer, but also a copolymer of the vinyl chloride-based monomer and a vinyl-based monomer copolymerizable with the vinyl chloride-based monomer, wherein the copolymer has the vinyl chloride-based monomer as a main component. When the vinyl chloride-based polymer is a copolymer of a vinyl chloride-based monomer and a vinyl-based monomer, the copolymer may include at least 50% of vinyl chloride. In this case, a vinyl-based monomer copolymerizable with the vinyl chloride-based monomer is the same as described before.

The vinyl chloride-based polymer may have a degree of polymerization of 1000 to 3000. In the present invention, the degree of polymerization is an average degree of polymerization measured by JIS K6721-77.

In addition, the vinyl chloride-based polymer may have an average particle diameter(D50) of 155 μm or less, more specifically, from 130 μm to 155 μm.

In addition, in the vinyl chloride-based polymer, the content of microparticles of 200 mesh or less may be 5.0 wt % or less, more specifically, 1.0 to 3.0 wt %.

In addition, the vinyl chloride-based polymer may have an apparent specific gravity of 0.55 $g/cm^3$ to 0.60 $g/cm^3$, more specifically, 0.56 $g/cm^3$ to 0.58 $g/cm^3$.

Furthermore, according to another embodiment of the present invention, there are provided a vinyl chloride-based resin composition including a vinyl chloride-based polymer prepared by the preparation method, and a molded product manufactured by the same.

Specifically, the vinyl chloride-based resin composition may further include a plasticizer having 30 parts by weight to 120 parts by weight based on 100 parts by weight of a vinyl chloride-based polymer prepared by the preparation method. If needed, it may further include at least one kind of additive, such as a dispersing diluent, a stabilizer, a lubricant, a viscosity control agent, and a foaming agent.

The vinyl chloride-based resin composition shows a decreased plasticizer absorption rate, and as a result, may have excellent processability by including a vinyl chloride-based polymer prepared by the preparation method and having excellent physical properties and a uniform particle size. Accordingly, the production rate can be increased when manufacturing a molded product, especially when manufacturing a heat resistant wire cover, a gasket, and the like.

Hereinafter, the present invention will now be described in more detail referring to examples and experimental examples in order to assist the understanding of the present invention. However, the following examples and experimental examples are only for illustrating the present invention and the scope of the present invention is not limited thereto.

Example 1

To a polymerization reactor having a capacity of 100 L and equipped with a reflux condenser, 100 parts by weight of a vinyl chloride-based monomer and 130 parts by weight of deionized water were added. Then, at the time of temperature rise in the polymerization reactor, 0.055 parts by weight of a 1a polyvinyl alcohol having a degree of saponification of 80 mol %, 0.013 parts by weight of a 1b polyvinyl alcohol having a degree of saponification of 72 mol %, 0.004 parts by weight of a second polyvinyl alcohol having a degree of saponification of 55 mol %, and 0.013 parts by weight of mecellose (mecellose, gel point: 61° C., hydrophobic group content=38 wt % (the degree of substitution with methoxy groups 28 wt %, the degree of substitution with hydroxypropyl group 10 wt %)) were added thereto. In addition, 0.05 parts by weight of t-butyl peroxyneodecanoate (BND) was added as a polymerization initiator thereto, and then air and nitrogen were removed by de-pressuring and stirring the inside of the polymerization reactor. Afterwards, the reaction was performed while maintaining the temperature inside the polymerization reactor at 58° C.

throughout the reaction process by heating. After 60 minutes of the reaction, 20 parts by weight of a vinyl chloride-based monomer was additionally added over 50 minutes. After that, the reactor was cooled upon reaching 6.8 kgf/cm$^2$, that is, a change of 1.0 kg/cm$^2$ from the equilibrium pressure at the polymerization temperature in the polymerization reactor, and the reaction was terminated after adding 0.04 parts by weight of triethylene glycol-bis-[3-(3-t-butyl-5-methyl-4-hydroxyphenyl) propionate as an antioxidant. Thereafter, an unreacted vinyl chloride-based monomer and vinyl chloride resin slurry were respectively recovered through de-vacuuming. The recovered resin slurry was washed and then dried for one night to obtain a vinyl chloride-based polymer having a degree of polymerization of 1000.

Example 2

A vinyl chloride-based polymer was prepared by the same method as described in Example 1 except that polyvinyl alcohol having a degree of saponification of 78 mol % was used as a 1a polyvinyl alcohol instead of polyvinyl alcohol having a degree of saponification of 80 mol %.

Example 3

A vinyl chloride-based polymer was prepared by the same method as described in Example 1 except that 0.05 parts by weight of polyvinyl alcohol having a degree of saponification of 84 mol % was used as a 1a polyvinyl alcohol instead of polyvinyl alcohol having a degree of saponification of 80 mol %.

Example 4

A vinyl chloride-based polymer was prepared by the same method as described in Example 1 except for using mecellose having different properties (gel point: 90° C., hydrophobic group content=20 wt % (degree of substitution with methoxy groups of 12 wt % and degree of substitution with hydroxypropyl groups of 8 wt %)) from those of the mecellose used in Example 1.

Example 5

To a polymerization reactor having a capacity of 100 L and equipped with a reflux condenser, 100 parts by weight of a vinyl chloride-based monomer and 130 parts by weight of deionized water were added. Then, at the time of temperature rise in the polymerization reactor, 0.055 parts by weight of a 1a polyvinyl alcohol having a degree of saponification of 80 mol %, 0.013 parts by weight of a 1b polyvinyl alcohol having a degree of saponification of 72 mol %, 0.004 parts by weight of a second polyvinyl alcohol having a degree of saponification of 55 mol %, and 0.013 parts by weight of mecellose (mecellose, gel point: 61° C., hydrophobic group content=38 wt % (the degree of substitution with methoxy groups 28 wt %, the degree of substitution with hydroxypropyl group 10 wt %)) were added thereto. In addition, 0.05 parts by weight of t-butyl peroxyneodecanoate (BND) was added as a polymerization initiator thereto, and then air and nitrogen were removed by de-pressuring and stirring the inside of the polymerization reactor. Afterwards, the reaction was performed while maintaining the temperature inside the polymerization reactor at 58° C. throughout the reaction process by heating. When the polymerization conversion rate was 5%, 700 ppm of diallyl phthalate (DAP) was added as a cross-liking agent. After 60 minutes of the reaction, 20 parts by weight of a vinyl chloride-based monomer was additionally added over 50 minutes. After that, the reactor was cooled upon reaching 6.8 kgf/cm$^2$, that is, a change of 1.0 kg/cm$^2$ from the equilibrium pressure at the polymerization temperature in the polymerization reactor, and the reaction was terminated after adding 0.04 parts by weight of triethylene glycol-bis-[3-(3-t-butyl-5-methyl-4-hydroxyphenyl) propionate as an antioxidant. Thereafter, an unreacted vinyl chloride-based monomer and vinyl chloride resin slurry were respectively recovered through de-vacuuming. The recovered resin slurry was washed and then dried for one night to obtain a vinyl chloride-based polymer having a degree of polymerization of 1000.

Example 6

To a polymerization reactor having a capacity of 100 L and equipped with a reflux condenser, 100 parts by weight of a vinyl chloride-based monomer and 130 parts by weight of deionized water were added. Then, at the time of temperature rise in the polymerization reactor, 0.055 parts by weight of a 1a polyvinyl alcohol having a degree of saponification of 80 mol %, 0.013 parts by weight of a 1b polyvinyl alcohol having a degree of saponification of 72 mol %, 0.004 parts by weight of a second polyvinyl alcohol having a degree of saponification of 55 mol %, and 0.013 parts by weight of mecellose (mecellose, gel point: 61° C., hydrophobic group content=38 wt % (degree of substitution with methoxy groups of 28 wt % and degree of substitution with hydroxypropyl groups of 10 wt %)) were added thereto. In addition, 0.01 parts by weight of sodium bicarbonate was added as a base, and 0.05 parts by weight of t-butyl peroxyneodecanoate (BND) was added as a polymerization initiator thereto, and then air and nitrogen were removed by de-pressuring and stirring the inside of the polymerization reactor. Afterwards, the reaction was performed while maintaining the temperature inside the polymerization reactor at 58° C. throughout the reaction process by heating. When the polymerization conversion rate was 5%, 700 ppm of diallyl phthalate (DAP) was added as a cross-liking agent. After 60 minutes of the reaction, 20 parts by weight of a vinyl chloride-based monomer was additionally added over 50 minutes. After that, the reactor was cooled upon reaching 6.8 kgf/cm$^2$, that is, a change of 1.0 kg/cm$^2$ from the equilibrium pressure at the polymerization temperature in the polymerization reactor, and the reaction was terminated after adding 0.04 parts by weight of triethylene glycol-bis-[3-(3-t-butyl-5-methyl-4-hydroxyphenyl) propionate as an antioxidant. Thereafter, an unreacted vinyl chloride-based monomer and vinyl chloride resin slurry were respectively recovered through de-vacuuming. The recovered resin slurry was washed and then dried for one night to obtain a vinyl chloride-based polymer having a degree of polymerization of 1000.

Comparative Example 1

A vinyl chloride-based polymer was prepared by the same method as described in Example 1 except that polyvinyl alcohol having a degree of saponification of 88 mol % was used as a 1a polyvinyl alcohol instead of polyvinyl alcohol having a degree of saponification of 80 mol %.

Comparative Example 2

A vinyl chloride-based polymer was prepared by the same method as described in Example 1 except that 0.006 parts by weight of polyvinyl alcohol having a degree of saponification of 40 mol % was used as a second polyvinyl alcohol instead of polyvinyl alcohol having a degree of saponification of 55 mol %.

Comparative Example 3

A vinyl chloride-based polymer was prepared by the same method as described in Example 1 except that mecellose was not used.

Comparative Example 4

A vinyl chloride-based polymer was prepared by the same method as described in Example 1 except that a mixture of two kinds of polyvinyl alcohol, one of which is 0.055 parts by weight of a 1a polyvinyl alcohol having a degree of saponification of 80 mol % and the other of which is 0.013 parts by weight of a 1b polyvinyl alcohol having a degree of saponification of 72 mol %, was used as a dispersant instead of a second polyvinyl alcohol, and mecellose was not used.

Comparative Example 5

A vinyl chloride-based polymer was prepared by the same method as described in Example 1 except that a mixture of two kinds of polyvinyl alcohol, one of which is 0.013 parts by weight of a 1b polyvinyl alcohol having a degree of saponification of 72 mol % and the other of which is 0.004 parts by weight of a second polyvinyl alcohol having a degree of saponification of 55 mol %, was used as a dispersant instead of a 1a polyvinyl alcohol having a degree of saponification of 80 mol %.

Comparative Example 6

A vinyl chloride-based polymer was prepared by the same method as described in Example 1 except that 0.08 parts by weight of a 1a polyvinyl alcohol having a degree of saponification of 80 mol % was used as a dispersant.

Comparative Example 7

A vinyl chloride-based polymer was prepared by the same method as described in Example 1 except that mecellose having different properties (gel point: 50° C., hydrophobic group content=46 wt % (degree of substitution with methoxy groups of 30 wt % and degree of substitution with hydroxypropyl groups of 16 wt %)) from those of the mecellose used in Example 1 was used.

Comparative Example 8

A vinyl chloride-based polymer was prepared by the same method as described in Example 1 except that mecellose having different properties (gel point: 95° C., hydrophobic group content=15 wt % (degree of substitution with methoxy groups or 15 wt % and degree of substitution with hydroxypropyl groups of 0 wt %)) from those of the mecellose used in Example 1 was used.

Comparative Example 9

A vinyl chloride-based polymer was prepared by the same method as described in Example 1 except that mecellose was added when the polymerization conversion rate was 75%.

Experimental Example

Average particle diameter(D50), content of fine particles of 200 mesh or less (Fine 200 mesh (%)), and apparent specific gravity were respectively measured for the vinyl chloride-based polymers prepared in Examples 1 to 4 and Comparative Examples 1 to 9.

Average particle diameter (D50): measured with a HELOS particle size analyzer (manufactured by Sumpatec).

Content of fine particles of 200 mesh or less (Fine 200 mesh (%)): measured with a HELOS particle size analyzer (manufactured by Sumpatec) (the lower the value, the smaller the deviation).

Apparent specific gravity: measured according to JIS K6721-1959.

In addition, the maximum flow rate and the amount of generated particle residue in a reflux condenser during the preparation of the vinyl chloride-based polymer were respectively measured, wherein the maximum flow rate in the reflux condenser represents the maximum peak flow rate of cooling water introduced into the reflux condenser during the preparation of the vinyl chloride-based polymer, and the amount of generated particle residue was evaluated according to the following criteria:

◎: The amount of generated particle residue is very small, 2 wt % or less

○: The amount of generated particle residue is small, greater than 2 wt % to 4 wt % or less Δ: The amount of generated particle residue is large, greater than 4 wt %

In addition, plasticizer absorption rates of vinyl chloride-based resin compositions comprising the vinyl chloride-based polymer prepared in Examples 1 to 4 and Comparative Examples 1 to 9, respectively, were measured.

The vinyl chloride-based resin compositions were prepared by adding 35 parts by weight of dioctyl phthalate (DOP) as a plasticizer, 2 parts by weight of an organic tin compound (MT-800, manufactured by Songwon Industrial Co., Ltd.) as a heat stabilizer, and 1 part by weight of a lubricant (SONGSTAB SL-29, manufactured by Songwon Industrial Co., Ltd.) to 100 parts by weight of the vinyl chloride-based polymer prepared in Examples 1 to 4 and Comparative Examples 1 to 9, respectively, and then mixing.

Plasticizer absorption rate (wt %): shown as a percentage of the weight of a sample before absorption, after the amount of DOP (dioctyl phthalate) absorbed into the sample according to ASTM D3367-95 is measured.

Figure 2:
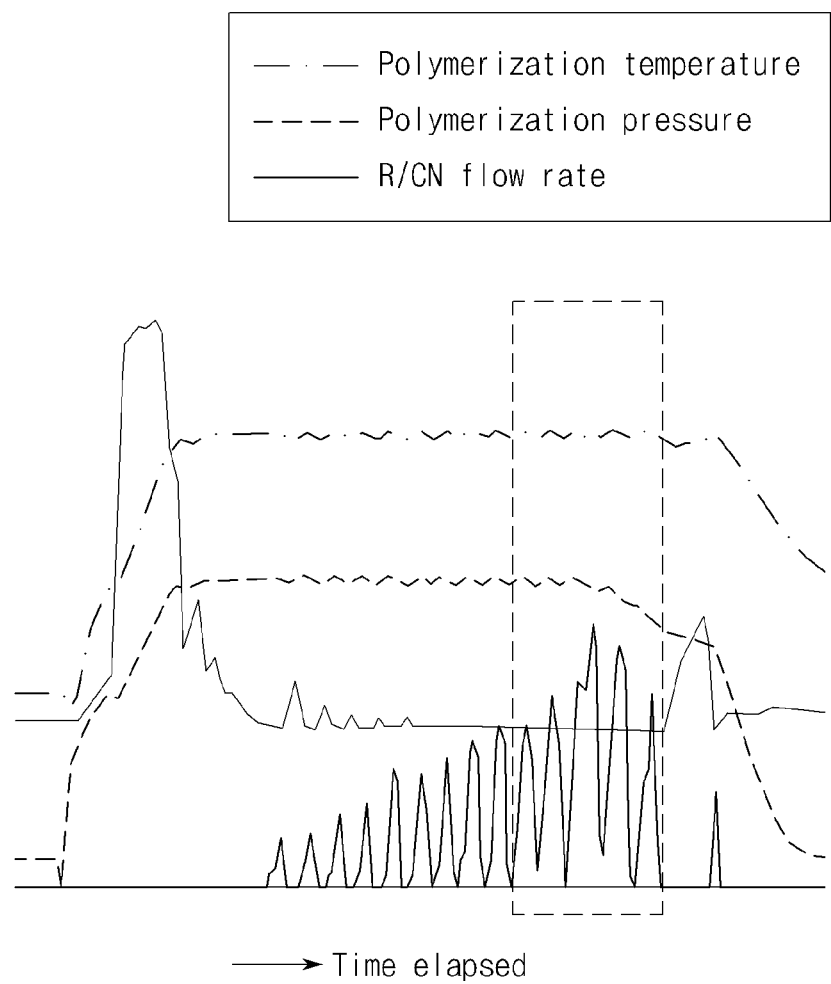
FIG. 2 is a graph illustrating a heat removal pattern observed during the preparation of a vinyl chloride-based polymer according to Example 1.

The results are shown in Table 1, and FIGS. 1 and 2.

TABLE 1

|  | Examples | | | | Comparative Examples | | | | | | | | |
| --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 |
| A (mol %) | 80 | 78 | 84 | 80 | 88 | 80 | 80 | 80 | — | 80 | 80 | 80 | 80 |
| B (mol %) | 72 | 72 | 72 | 72 | 72 | 72 | 72 | 72 | 72 | — | 72 | 72 | 72 |
| C (mol %) | 55 | 55 | 55 | 55 | 55 | 40 | 55 | — | 55 | — | 55 | 55 | 55 |

TABLE 1-continued

| | Examples | | | | Comparative Examples | | | | | | | | |
|---|---|---|---|---|---|---|---|---|---|---|---|---|---|
| | 1 | 2 | 3 | 4 | 1 | 2 | 3 | 4 | 5 | 6 | 7 | 8 | 9 |
| D (mol %) | 77 | 76 | 80 | 77 | 83 | 75 | 77 | 78 | 68 | 80.0 | 77 | 77 | 77 |
| M (° C.) | 61 | 61 | 61 | 90 | 61 | 61 | — | — | 61 | 61 | 50 | 95 | 61 |
| Timing of mecellose addition | Before polymerization | Before polymerization | Before polymerization | Before polymerization | Before polymerization | Before polymerization | — | — | Before polymerization | Before polymerization | Before polymerization | Before polymerization | Polymerization conversion rate 75% |
| $D_{50}$ (μm) | 155 | 152 | 154 | 155 | 168 | 166 | 182 | 178 | 128 | 159 | 162 | — | 174 |
| Fine particle (%) | 2.2 | 1.4 | 2.2 | 2.7 | 1.2 | 1.1 | 1.5 | 1.7 | 4.1 | 4.2 | 2.9 | — | 2.2 |
| Apparent specific gravity (g/cm$^3$) | 0.58 | 0.56 | 0.58 | 0.60 | 0.60 | 0.58 | 0.61 | 0.57 | 0.55 | 0.58 | 0.56 | — | 0.56 |
| Plasticizer absorption rate (wt %) | 11.7 | 12.1 | 11.5 | 11.2 | 11.2 | 14.5 | 10.2 | 13.1 | 20.0 | 10.3 | 12.9 | — | 13.7 |
| R/CN flow rate (%) | 42 | 43 | 46 | 48 | 96 | 94 | 58 | 87 | 62 | 48 | 63 | — | 53 |
| Amount of particle residue generated | ⊚ | ⊚ | ⊚ | ○ | ⊚ | ○ | △ | △ | △ | ⊚ | △ | — | △ |

\* A: molar degree of saponification of 1a dispersant
\* B: molar degree of saponification of 1b dispersant
\* C: molar Degree of saponification of second dispersant
\* D: mole average degree of saponification of dispersant
\* M: gel point of mecellose
\* $D_{50}$: average particle diameter of vinyl chloride-based polymer
\* Fine particle: content of fine particles of 200 mesh or less
\* R/CN flow rate: maximum flow rate in reflux condenser As shown in Table 1, in the cases of Examples 1 to 4 in which the mole average degree of saponification (mole average degree of saponification of a dispersant) of a polyvinyl alcohol mixture is 76 to 80 mol %, and mecellose was included, the particle properties of prepared vinyl chloride-based polymers were excellent; the amount of particle residue generated was small; and the maximum flow rate in the reflux condenser was reduced in half compared to Comparative Examples 1 to 9.

Specifically, in the cases of Comparative Examples 1 and 2, in which vinyl chloride-based polymers were prepared by the same method as in Examples 1 and 3, other than that polyvinyl alcohol mixtures having different mole average degrees of saponification were used, the maximum flow rate in the reflux condenser was greatly increased by more than two times when compared to Examples 1 and 3, respectively, and the particle uniformity of prepared vinyl chloride-based polymers was reduced.

Also, in the case of Comparative Example 7, in which a vinyl chloride-based polymer was prepared by the same method as in Example 1 except that mecellose having a gel point lower than the temperature proposed by the present invention was used, the amount of particle residue generated was increased, and the maximum flow rate in the reflux condenser was increased by 1.5 times compared to Example 1.

In addition, in the case of Comparative Example 8 in which a vinyl chloride-based polymer was prepared by the same method as in Example 4 except that mecellose having a gel point higher than the temperature proposed by the present invention was used, a vinyl chloride-based polymer was not formed.

The above results suggest that it is important to control the mole average degree of saponification of a polyvinyl alcohol mixture, and the gel point of water soluble cellulose ether in order to achieve the object of the present invention, which is to provide a novel method for preparing a vinyl chloride-based polymer, the method capable of uniformly distributing heat removal flow rate by activating the initial reaction and by controlling heating value at the end of the reaction, and thus, improving productivity.

Meanwhile, FIG. 1 is a graph illustrating a heat removal pattern observed during the preparation of a vinyl chloride-based polymer according to Comparative Example 1, and FIG. 2 is a graph illustrating a heat removal pattern observed during the preparation of a vinyl chloride-based polymer according to Example 1.

As shown in the figures, in the case of Comparative Example 1, the heat removal pattern shows insufficient heat removal flow rate due to a large increase in heating value at the end of the polymerization, while in the case of Example 1, the maximum heating value at the end of the reaction was reduced, and as a result, it was possible to secure the heat removal flow rate.

The invention claimed is:

1. A method for preparing a vinyl chloride-based polymer, the method comprising:
   a step for performing suspension polymerization of a monomer for preparing a vinyl chloride-based polymer in the presence of a polymerization initiator, a dispersant, and water soluble cellulose ether,
   wherein the dispersant includes a mixture of a first polyvinyl alcohol having a degree of saponification of 60 mol % to 90 mol % and a second polyvinyl alcohol having a degree of saponification of 40 mol % to less than 60 mol % at a weight ratio of 10:1 to 20:1, and a mole average degree of saponification of the polyvinyl alcohol mixture is from 76 mol % to 80 mol %, wherein the first polyvinyl alcohol includes a 1a polyvinyl alcohol having a degree of saponification of 75 mol % to 90 mol % and a 1b polyvinyl alcohol having a degree of saponification of 60 mol % to less than 75 mol % at a weight ratio of 4:1 to 8:1, and wherein the water soluble cellulose ether has a gel point of 60° C. to 90° C., and is added before the initiation of the polymerization or at a time in which the polymerization conversion rate is 70% or less.

2. The method of claim 1, wherein the dispersant is included in an amount of 0.05 to 0.15 parts by weight based on 100 parts by weight of a vinyl chloride-based monomer.

3. The method of claim 1, wherein the dispersant is added before the initiation of the polymerization or at a time in which the polymerization conversion rate is 10% or less.

4. The method of claim 1, wherein the water soluble cellulose ether has a hydrophobic group in an amount of 20 to 40 wt % based on the total weight of the water soluble cellulose ether.

5. The method of claim 1, wherein the water soluble cellulose ether is added in an amount of 0.01 to 0.02 parts by weight based on 100 parts by weight of the vinyl chloride-based monomer.

6. The method of claim 1, wherein the dispersant and the water soluble cellulose ether are added at a weight ratio of 5:1 to 10:1.

7. The method of claim 1, wherein the polymerization is performed at a temperature of 50° C. to 65° C.

8. The method of claim 1, wherein an antioxidant is further added when the pressure change is in a range of 0.5 $kg/cm^2$ to 1.5 $kg/cm^2$ based on the equilibrium pressure at the polymerization temperature in the polymerization reactor.

9. The method of claim 1, wherein a cross-linking agent is further added before the initiation of polymerization or at a time in which the polymerization conversion rate is 5% or less.

10. The method of claim 1, wherein a base is further added in an amount of 0.001 to 0.5 parts by weight based on 100 parts by weight of a monomer for preparing the vinyl chloride-based polymer.

11. A vinyl chloride-based polymer prepared by the method of claim 1, and having an average particle diameter of 130 to 150 μm, and an apparent specific gravity of 0.55 to 0.6.

12. A vinyl chloride-based resin composition comprising the vinyl chloride-based polymer of claim 11.

13. The vinyl chloride-based resin composition of claim 12, wherein the composition includes 30 to 120 parts by weight of a plasticizer based on 100 parts by weight of the vinyl chloride-based polymer.

* * * * *